No. 792,137. PATENTED JUNE 13, 1905.
R. R. JONES.
ANGLE COCK HOLDER AND PIPE CLAMP FOR AIR BRAKES FOR RAILWAY CARS.
APPLICATION FILED MAR. 24, 1905.
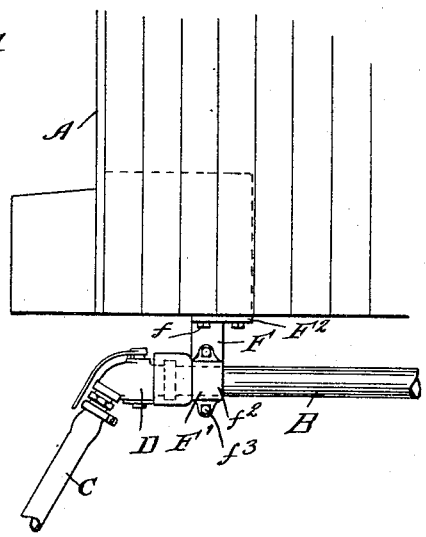
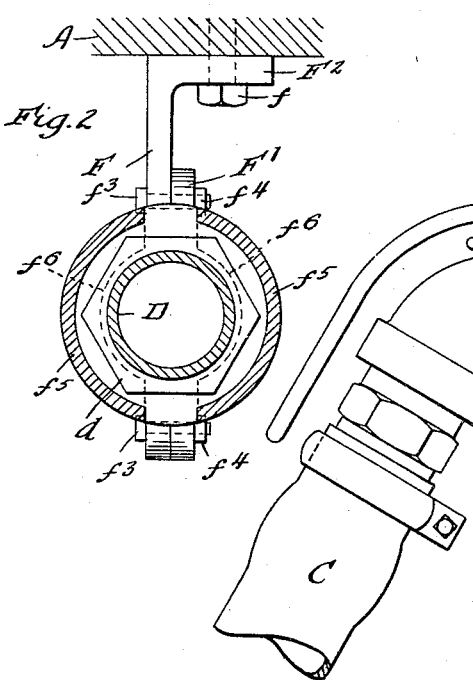
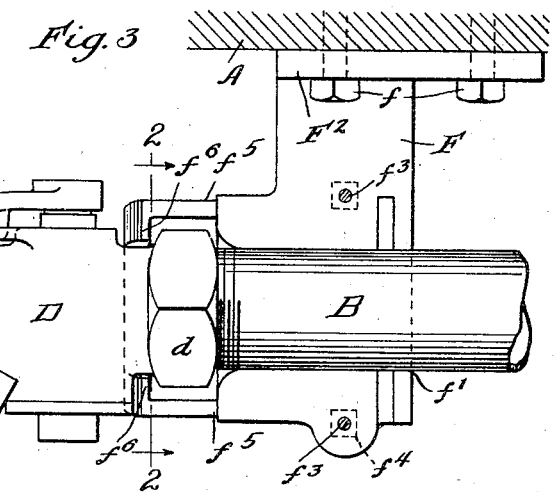
Witnesses:
Wm. Geiger
Inventor:
Robert R. Jones
By Munday, Evarts & Adcock
Attorneys No. 792,137. Patented June 13, 1905.

UNITED STATES PATENT OFFICE.

ROBERT R. JONES, OF CHICAGO, ILLINOIS.

ANGLE-COCK HOLDER AND PIPE-CLAMP FOR AIR-BRAKES FOR RAILWAY-CARS.

SPECIFICATION forming part of Letters Patent No. 792,137, dated June 13, 1905.

Application filed March 24, 1905. Serial No. 251,753.

*To all whom it may concern:*

Be it known that I, ROBERT R. JONES, a citizen of the United States, residing in Chicago, in the county of Cook and State of Illinois, have invented a new and useful Improvement in Angle-Cock Holders and Pipe-Clamps for Air-Brakes for Railway-Cars, of which the following is a specification.

My invention relates to improvements in angle-cock holders and pipe-clamps for air-brakes of railway-cars.

Great difficulty has heretofore been experienced in the practical use of air-brakes on railway-cars by reason of the angle-cocks, which are screwed on the ends of the air-brake pipe and connect with the hose extending between the adjacent cars, becoming unscrewed from the pipe and lost. On a single railway the loss from this source frequently amounts to several hundred dollars per month, as I know from my own practical experience and observation.

The object of my invention is to provide an efficient and durable device for clamping or supporting the air-brake pipe and holding the angle-cock, of simple construction, and by means of which the difficulty heretofore experienced may be entirely overcome or avoided.

My invention consists in the means I employ for practically accomplishing this object or result—that is to say, it consists in a two-part pipe-clamp adapted to embrace the air-brake pipe and provided with a bracket or arm adapted to be secured to the car-frame to support the end of the air-brake pipe and furnished at its end with a holder or socket to embrace the hexagonal head or end of the angle-cock, and thus prevent the angle-cock, which is threaded onto the end of the brake-pipe, from becoming lost.

In the accompanying drawings, forming a part of this specification, Figure 1 is a side elevation of an air-brake pipe-clamp and angle-cock holder embodying my invention. Fig. 2 is a section on line 2 2 of Fig. 3. Fig. 3 is an enlarged detail elevation showing a portion of the car-frame in section with one of the clamps removed.

In the drawings, A represents a portion of a railway-car frame; B, the air-brake pipe; C, the flexible hose connecting the air-brake pipes of adjacent cars, and D the angle-cock which connects the pipe B and hose C. All these parts are of the ordinary construction heretofore customarily in use.

F F' represent my two-part air-brake pipe-clamp and angle-cock holder. The part or member F of the clamp is furnished with an arm or bracket $F^2$, by means of which it is attached to the car-frame A by bolts $f$. The part or clamp F is furnished with a semicircular socket $f'$, which in connection with the similar socket $f^2$ receives and embraces the pipe B. The part or member F' of the clamp is removably secured to the part F by bolts $f^3$, having threaded nuts $f^4$. Each of the parts or members F F' of the clamp is provided with an integral projection or holder $f^5$, having an inwardly-projecting lip or shoulder $f^6$, forming a socket to receive the non-circular or hexagonal end or head $d$ of the angle-cock D, and which holder thus embraces the head or end $d$ of the angle-cock and prevents all possibility of the angle-cock becoming lost, even if it should become disengaged or unscrewed from the pipe B.

The inwardly-projecting lip or shoulder $f^6$ of the angle-cock holder $f^5$ fits behind the shoulder formed by the angle-cock head or end $d$, and thus embraces said head or end and renders it impossible for the angle-cock to become disengaged from its holder, even if it becomes unscrewed from the pipe B. With my device there is thus no danger or possibility of the angle-cock being lost, even though it becomes disengaged from the air-brake pipe B.

I claim—

1. The combination with an air-brake pipe and angle-cock, of a two-part clamp embracing the pipe and furnished with an integral projection or holder, having a socket to receive and embrace the head of the angle-cock and prevent the same becoming lost in case the angle-cock becomes disengaged from the pipe, substantially as specified.

2. A two-part air-brake pipe-clamp and angle-cock holder, having a socket at its front end to embrace the head or end of the angle-cock, substantially as specified.

3. The combination with an air-brake pipe and angle-cock, of a two-part clamp embracing the pipe and furnished with an integral projection or holder, having a socket to receive and embrace the head of the angle-cock and prevent the same becoming lost in case the angle-cock becomes disengaged from the pipe, said holder for the angle-cock having an inwardly-projecting lip or shoulder fitting behind the head or end of the angle-cock, substantially as specified.

4. The two-part air-brake pipe-clamp and angle-cock holder provided with a socket at its front end and an inwardly-projecting lip or shoulder to embrace the head or end of the angle-cock and prevent the same becoming lost in case it becomes unscrewed or disengaged from the air-brake pipe, substantially as specified.

ROBERT R. JONES.

Witnesses:
H. M. MUNDAY,
P. ABRAMS.